(12) United States Patent
Sturrs et al.

(10) Patent No.: US 11,157,923 B1
(45) Date of Patent: Oct. 26, 2021

(54) DYNAMICALLY DETERMINING PROCUREMENT USER TYPES

(71) Applicant: Dell Products L.P., Round Rock, TX (US)

(72) Inventors: Paul Sturrs, Dublin (IE); Liam Donnelly, Naas (IE)

(73) Assignee: Dell Products L.P., Round Rock, TX (US)

( * ) Notice: Subject to any disclaimer, the term of this patent is extended or adjusted under 35 U.S.C. 154(b) by 551 days.

(21) Appl. No.: 15/883,688

(22) Filed: Jan. 30, 2018

(51) Int. Cl.
*G06Q 30/02* (2012.01)
*G06N 20/00* (2019.01)

(52) U.S. Cl.
CPC ......... *G06Q 30/0201* (2013.01); *G06N 20/00* (2019.01)

(58) Field of Classification Search
CPC ........ G06Q 10/06; G06Q 30/06; G06Q 30/02; G06Q 30/0631; G06Q 20/3227; G06Q 10/10; G06Q 30/08; G06Q 10/087; G06Q 10/02; G06Q 30/0635; G06N 99/005
See application file for complete search history.

(56) References Cited

U.S. PATENT DOCUMENTS

| | | | |
|---|---|---|---|
| 9,406,091 B1* | 8/2016 | Lopez | G06Q 50/01 |
| 2015/0235240 A1* | 8/2015 | Chang | G06Q 30/0202 |
| | | | 705/7.31 |
| 2015/0254675 A1* | 9/2015 | Kannan | G06Q 30/02 |
| | | | 705/304 |
| 2016/0232470 A1* | 8/2016 | Zhou | G06Q 10/06316 |
| 2016/0342911 A1* | 11/2016 | Kannan | G06Q 10/0631 |

OTHER PUBLICATIONS

Krishnan, Gokul S. et al. "Dynamic and temporal user profiling for personalized recommenders using heterogeneous data sources." 2017 8th International Conference on Computing, Communication and Networking Technologies (ICCCNT). IEEE, 2017 [Online], [retrieved Aug. 9, 2021], Retrieved from the internet. (Year: 2017).*

* cited by examiner

*Primary Examiner* — Jerry O'Connor
*Assistant Examiner* — Michael R Koester
(74) *Attorney, Agent, or Firm* — Ryan, Mason & Lewis, LLP (57) ABSTRACT

Methods, apparatus, and processor-readable storage media for dynamically determining procurement user types are provided herein. An example computer-implemented method includes extracting data, from multiple data sources associated with multiple procurement users, pertaining to interactions between the multiple procurement users and one or more procurement destinations; dynamically updating, based on an application of one or more machine learning algorithms to the extracted data, one or more existing procurement user types; dynamically creating, based on the application of the one or more machine learning algorithms to the extracted data, one or more new procurement user types; and outputting, via at least one user portal, the one or more updated procurement user types and the one or more new procurement user types.

20 Claims, 7 Drawing Sheets

DYNAMICALLY DETERMINING PROCUREMENT USER TYPES

FIELD

The field relates generally to information processing systems, and more particularly to techniques for processing user activity within such systems.

BACKGROUND

Determining and generating reliable and accurate representations of potential customers for a given product or service can serve great importance within an enterprise across a variety of functions such as sales and marketing, user experience and engineering. Such representations can assist an enterprise in making a multitude of decisions. However, there exists significant challenges in conventional approaches for generating such representations. For example, conventional approaches can be unduly limited by labor-intensive processes that typically take months to complete, often resulting in stagnant and inaccurate data. Additionally, such conventional processes commonly require continuous labor-intensive validation to maintain relevancy.

SUMMARY

Illustrative embodiments of the present invention provide information processing systems configured to dynamically determine procurement user types.

An exemplary computer-implemented method can include extracting data, from multiple data sources associated with multiple procurement users, pertaining to interactions between the multiple procurement users and one or more procurement destinations; dynamically updating, based on an application of one or more machine learning algorithms to the extracted data, one or more existing procurement user types; dynamically creating, based on the application of the one or more machine learning algorithms to the extracted data, one or more new procurement user types; and outputting, via at least one user portal, the one or more updated procurement user types and the one or more new procurement user types.

Illustrative embodiments can provide significant advantages relative to conventional processes for building personas. As used herein, personas refer to representations of a target audience(s) or type of procurement user of a given product, service, or offering. Personas can additionally be built within the context of one or more particular procurement destinations (such as an enterprise website, for example). Challenges associated with conventional persona building processes are overcome through the use of machine learning algorithms and neural networks in conjunction with existing big data to build real-time personas that evolve as procurement users evolve.

These and other illustrative embodiments described herein include, without limitation, methods, apparatus, systems, and computer program products comprising processor-readable storage media.

BRIEF DESCRIPTION OF THE DRAWINGS

FIG. 4A through FIG. 4D show an example sequence of procurement user type representation outputs in an illustrative embodiment.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
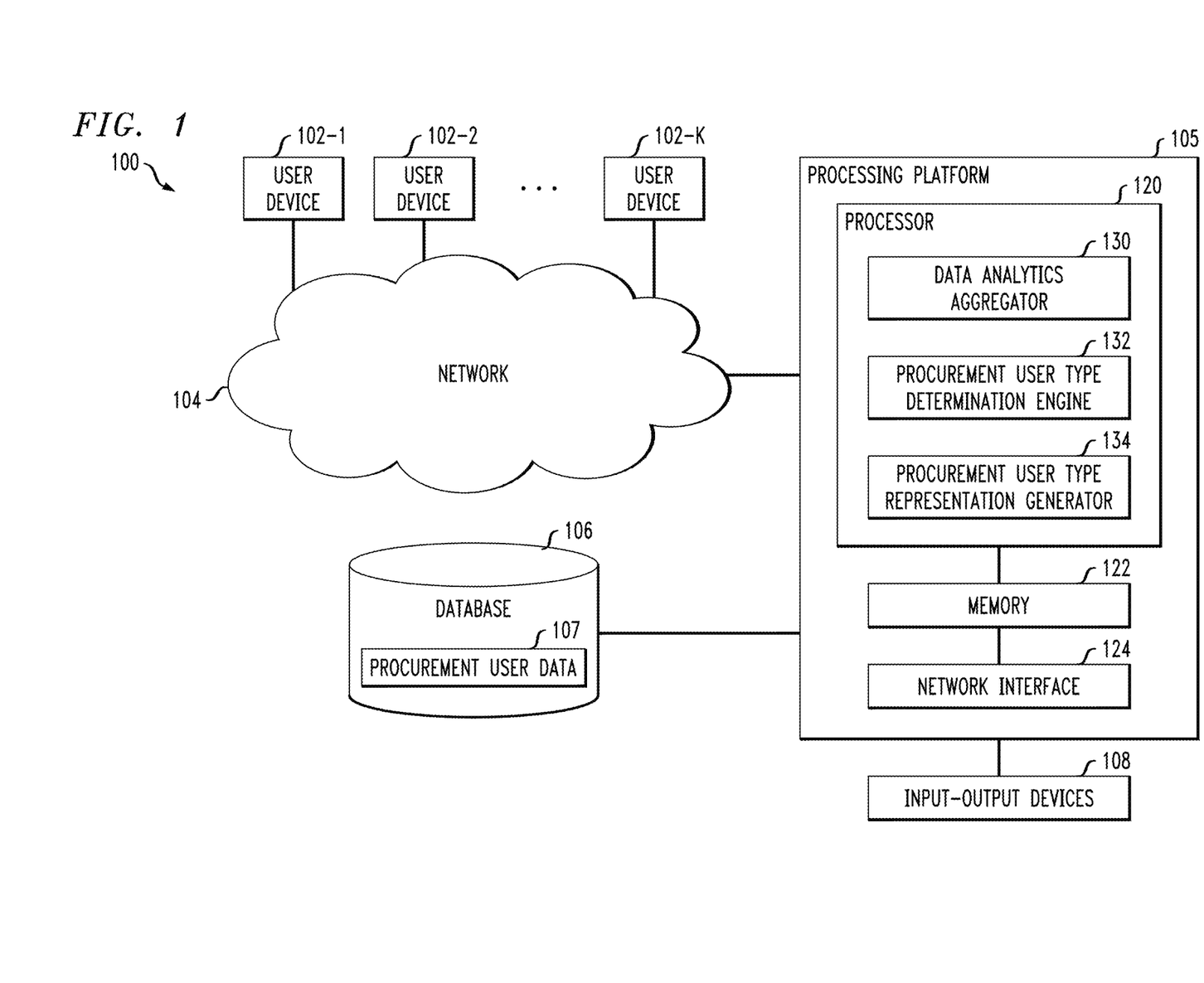
FIG. 1 is a block diagram of an information processing system configured for dynamically determining procurement user types in an illustrative embodiment.

FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a processing platform 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The processing platform 105 has an associated database 106 configured to store procurement user data 107, as further detailed herein.

The database 106 in the present embodiment is implemented using one or more storage systems associated with the processing platform 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the processing platform 105 are input-output devices 108, which illustratively comprise keyboards, displays or other types of input-output devices in any combination. Such input-output devices are used to support one or more user interfaces to the processing platform 105, as well as to support communication between the processing platform 105 and other related systems and devices not explicitly shown.

The processing platform 105 in the FIG. 1 embodiment is assumed to be implemented using at least one processing device. Each such processing device generally comprises at least one processor and an associated memory, and implements one or more functional modules for controlling certain features of the processing platform 105.

More particularly, the processing platform 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the processing platform 105 to communicate over the network 104 with the user devices 102, and illustratively comprises one or more conventional transceivers.

The processor 120 further comprises a data analytics aggregator 130, a procurement user type determination engine 132, and a procurement user type representation generator 134.

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the data analytics aggregator 130, procurement user type determination engine 132, and procurement user type representation generator 134 may be implemented at least in part in the form of software that is stored in memory 122 and executed by processor 120.

It is to be understood that the particular set of elements shown in FIG. 1 for dynamically determining procurement user types involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the processing platform 105 can be eliminated and associated elements such as data analytics aggregator 130, procurement user type determination engine 132, and procurement user type representation generator 134 can be implemented elsewhere in the computer network 100.

An exemplary process utilizing data analytics aggregator 130, procurement user type determination engine 132, and procurement user type representation generator 134 of the processing platform 105 in computer network 100 will be described in more detail with reference to the flow diagram of FIG. 5.

Additionally, examples of processing platforms that may be used to implement at least portions of the processing platform 105 of the FIG. 1 embodiment will be described in more detail below in conjunction with FIGS. 6 and 7. A given such processing platform comprises at least one processing device comprising a processor coupled to a memory, and the processing device may be implemented at least in part utilizing one or more virtual machines or other virtualization infrastructure. Additionally, the operation of the information processing system 100 will be described in further detail with reference to the flow diagram of FIG. 5.

As detailed herein, at least one embodiment of the invention includes dynamically generating real-time procurement user personas using big data and machine learning algorithms, wherein such personas remain relevant in changing user environments. By way of example, such an embodiment can include providing real-time information about individual personas, as well as providing accurate procurement user behavior and task analyses. Additionally, such an embodiment can include analyzing persona behaviors by monitoring and/or examining procurement user data flows informed by big data, such as by tracking a persona's engagement (for example, via heat mapping on a specific website or page), track persona spending patterns over time, etc. One or more personas updated or built in accordance with one or more embodiments of the invention can also evolve as procurement offerings (such as products, services, etc.) and/or procurement destinations (such as website, etc.) evolve.

In at least one embodiment of the invention, elements of a real-time persona can include a persona group identifier (that is, a name that distinguishes the persona type from other persona types), procurement user goals and tasks, procurement user behaviors and motivations (such as, for example, the purpose of a visit to a procurement destination), and procurement user frustrations (which can be manifested, for example, via site errors, bounce rate, etc.). Additionally, elements of a real-time person generated and/or updated via one or more embodiments of the invention can include technology data attributed to the procurement users (such as the web browser, operating system (OS), etc. of the procurement users), data pertaining the products that each procurement user type typically purchases, as well as industry segmentation based on procurement user purchases. Further, in one or more embodiments of the invention, real-time personas can also include elements such as the amount of time spent by procurement users on a particular web page, web site, etc., the average amount of money spent per persona based on time, and location and/or geographic data associated with each procurement user type.

Additionally, in one or more embodiments of the invention, customer spending information can be used as an attribute which categorizes persona groups. By way merely of example, consider the following use case illustration:

Persona Group 1=Users spending less than $10,000.00 per selected temporal period.

Persona Group 2=Users spending between $10,000.00 and $100,000.00 per selected temporal period.

Persona Group 3=Users spending more than $100,000.00 per selected temporal period.

Further, by way merely of illustration and not limitation, example types of personas utilized by one or more enterprises might include purchase analyst, purchase approver, sole decision maker, accumulator, validator, approver, indirect partner, etc. Moreover, in at least one embodiment of the invention, new personas can be dynamically created and added to an enterprise profile, and an enterprise user can obtain additional insights about a particular persona by clicking on or otherwise selecting one or more specific elements of the persona (such as procurement user goals and tasks, procurement user motivations, procurement user frustrations, time on site by procurement user, etc.).

Figure 2:
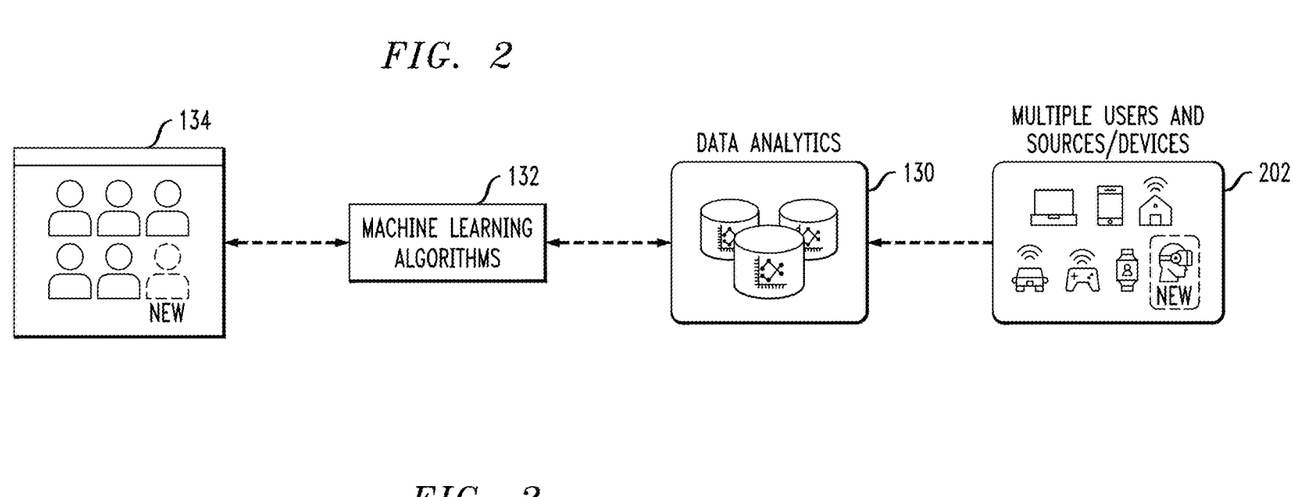
FIG. 2 shows another illustrative embodiment of an information processing system configured for creating new personas in an illustrative embodiment.

FIG. 2 shows another illustrative embodiment of an information processing system configured for creating new personas in an illustrative embodiment. By way of illustration, FIG. 2 depicts data analytics aggregator 130 extracting data 202 pertaining to procurement users from multiple sources and devices (such as, for example, Internet of Things (IoT) devices). Additionally, the procurement user type determination engine 132 applies one or more machine learning algorithms to the data extracted by aggregator 130, and the procurement user type representation generator 134 generates and outputs, in real-time, a new persona based on the determinations produced by engine 132. Such an output by generator 134 can include a representation of how procurement user behavior evolved when a new product or feature has been introduced to a website or an IoT device.

Figure 3:
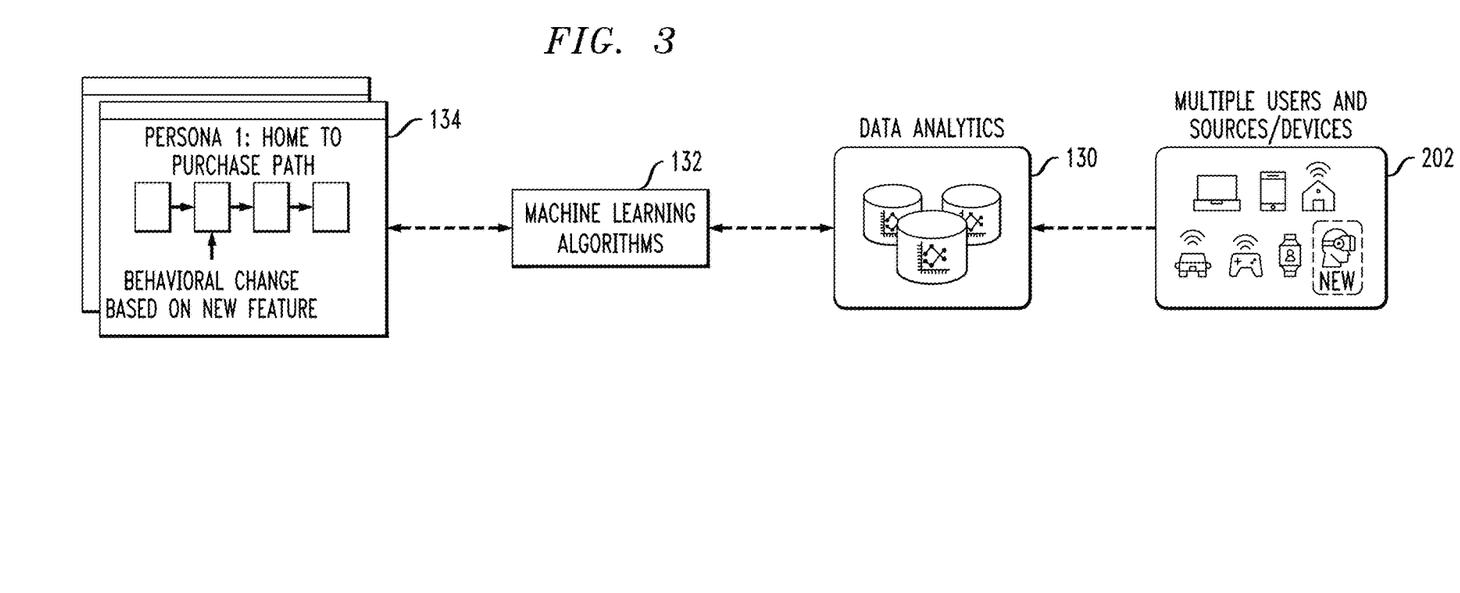
FIG. 3 shows another illustrative embodiment of an information processing system configured for updating existing personas in an illustrative embodiment.

FIG. 3 shows another illustrative embodiment of an information processing system configured for updating existing personas in an illustrative embodiment. By way of illustration, similar to FIG. 2 above, FIG. 3 depicts data analytics aggregator 130 extracting data 202 pertaining to procurement users from multiple sources and devices (such as, for example, IoT devices). Also, the procurement user type determination engine 132 applies one or more machine learning algorithms to the data extracted by aggregator 130, and the procurement user type representation generator 134 generates and outputs, in real-time, an updated persona based on determinations produced by engine 132. Such an output by generator 134 can include analysis and learnings derived from procurement user actions related to changes in procurement user behaviors on a website or IoT device. For example, when a new feature has been added to a website or product, such an embodiment can include analyzing the effects of the new feature on procurement user behavior in real-time.

As depicted in FIG. 2 and FIG. 3, the procurement user type determination engine 132 can include one or more machine learning algorithms that are implemented in generating the quantitative side of persona determination. Machine learning algorithms, such as used in one or more embodiments of the invention, can be classified as unsupervised or semi-supervised. Additionally, by way merely of example, specific machine learning algorithms that can be implemented in at least one embodiment of the invention can include clustering algorithms, association rule learning algorithms, and reinforcement learning algorithms.

Additionally, one or more embodiments of the invention can include capturing qualitative data for use in dynamically determining procurement user types. For example, within the context of the example embodiments depicted in FIG. 1, FIG. 2 and FIG. 3, the procurement user type representation generator 134 can provide users the ability to manually enter input such as research details captured from research techniques such as surveys, customer interviews, focus groups, etc. In such embodiments, the generated real-time procurement user type representations (that is, personas) are based on quantitative data (analytics and machine learning algorithms) and can be further tailored by a user based on qualitative data. For example, a user can manually update persona names, persona group names, persona biographical information, descriptions that are content-driven, etc.

Figure 4A:
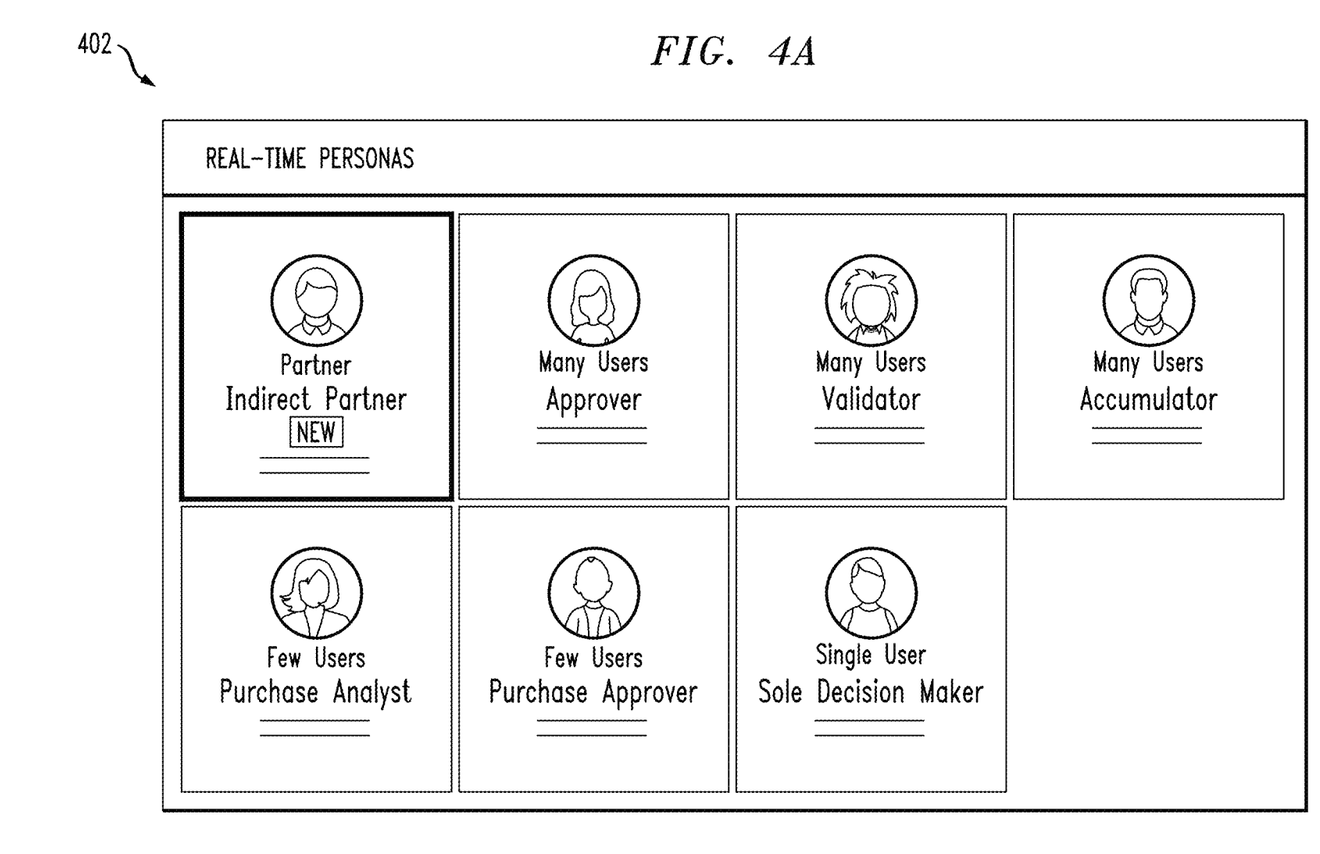

FIG. 4A through FIG. 4D shows an example sequence of procurement user type representation (persona) outputs in an illustrative embodiment. By way of illustration, FIG. 4A depicts a personas menu display page 402. The example personas menu display page 402 depicted in FIG. 4A includes visualizations of determined personas that include an indirect partner persona, an approver persona, a validator persona, an accumulator persona, a purchase analyst persona, a purchase approver persona, and a sole decision maker persona. It should be noted that the example personas depicted in FIG. 4A are merely for illustrative purposes only, and other persona types and names can be utilized and implemented in one or more embodiments of the invention.

Figure 4B:
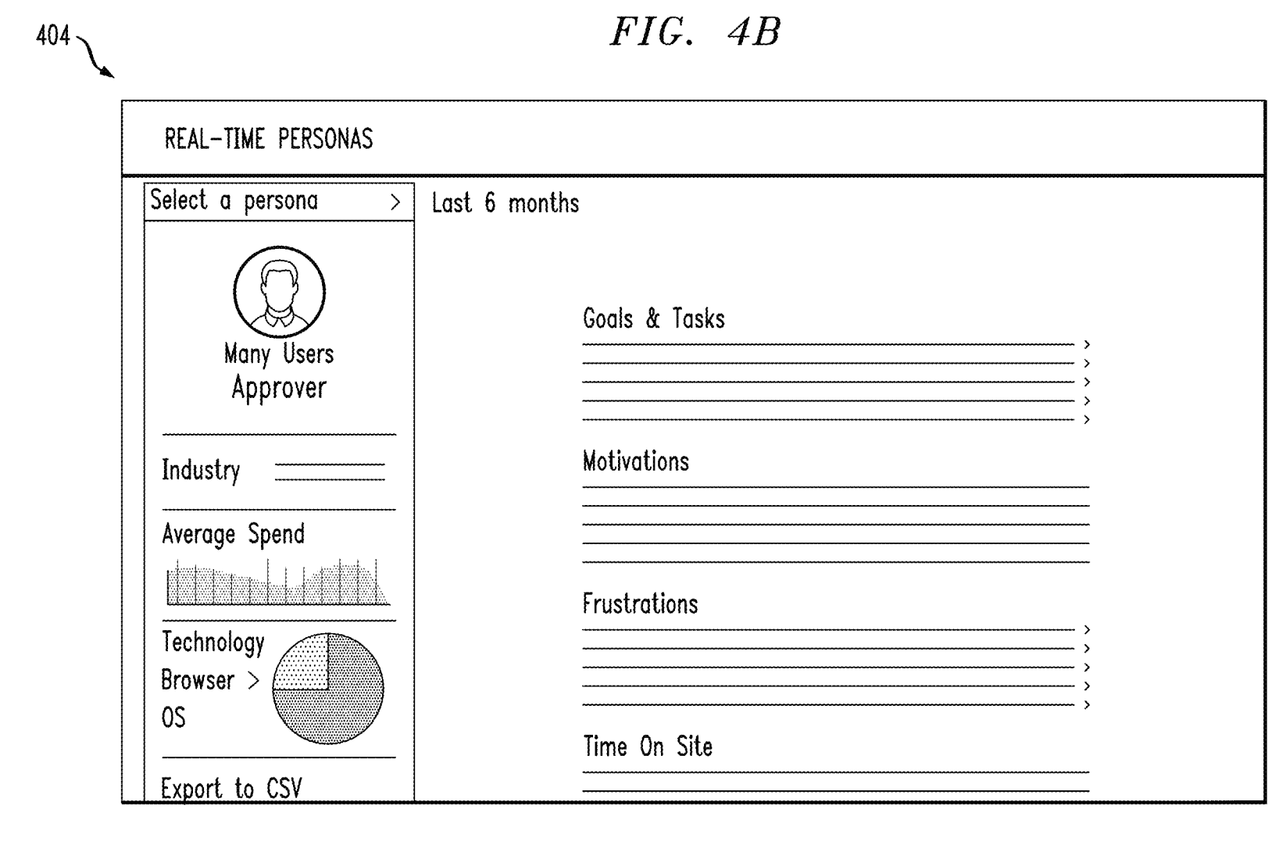
Figure 4C:
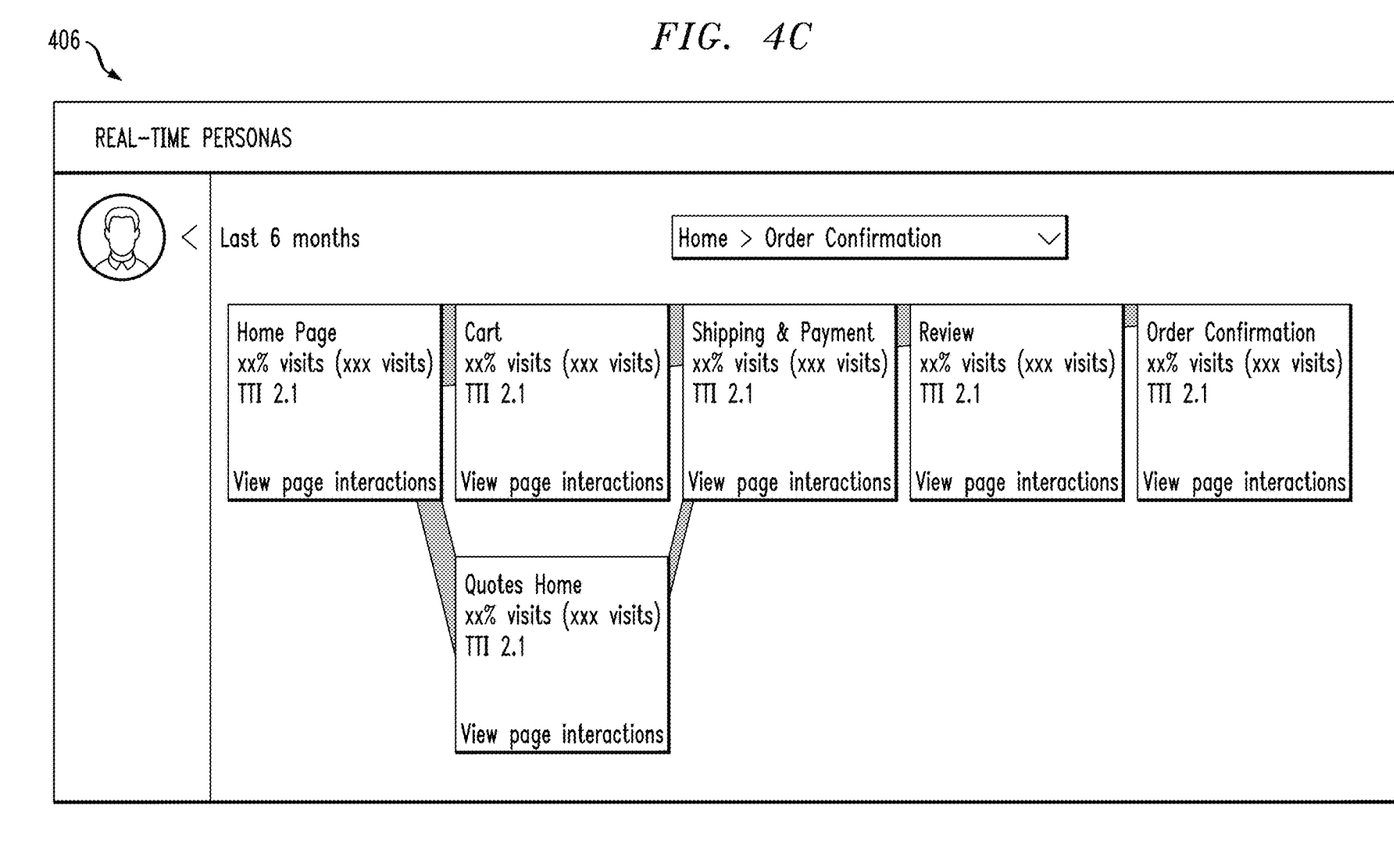
Figure 4D:
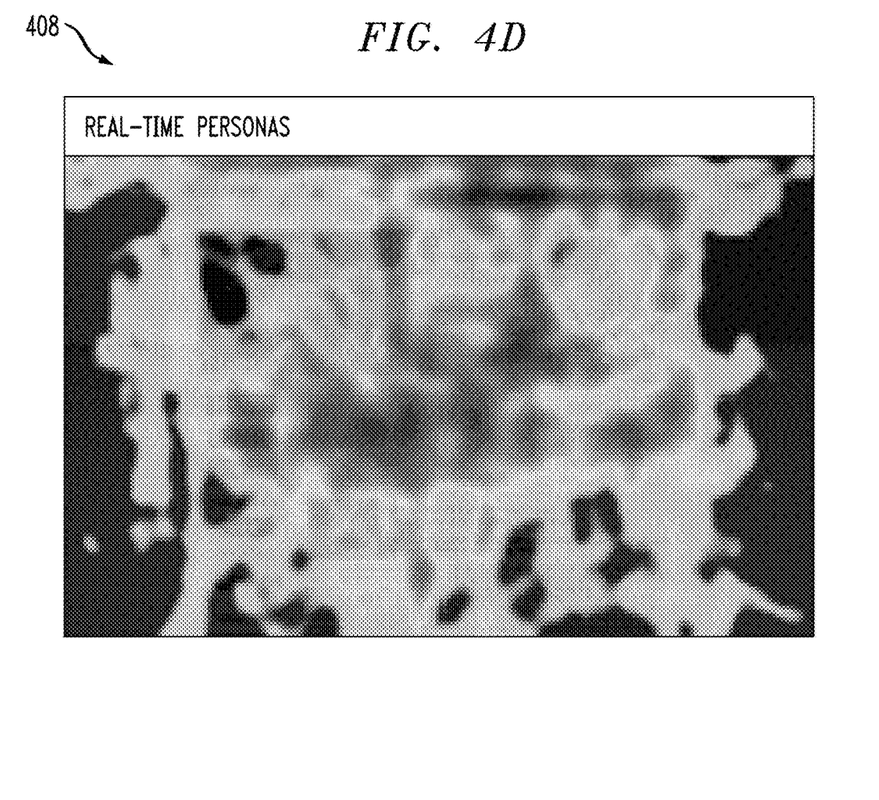

FIG. 4B depicts a persona template page 404, which captures the details and/or elements (such as biographical information, user goals and tasks, behaviors and motivations, frustrations, etc.) of a persona from menu display page 402 selected by a user. FIG. 4C depicts a page 406 illustrating persona flows detailing how the selected persona (such as the persona selected by the user from menu display page 402) works through a task and/or product. Additionally, FIG. 4D depicts a heat map that 408 is generated when the user selects and/or clicks-on persona flow page 406. For example, a procurement flow, one or more embodiments of the invention can include highlighting a customer's behavior. In such an embodiment, a user can click-on a step within the flow (on page 406) to see how the persona engages with a page or site via a generated heat map 408.

Figure 5:
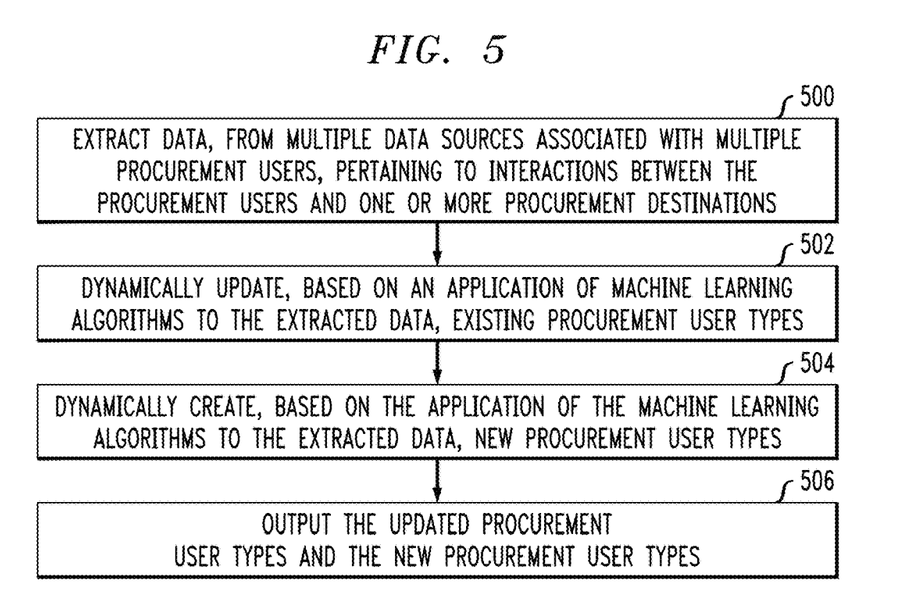
FIG. 5 is a flow diagram of a process for dynamically determining procurement user types in an illustrative embodiment.

FIG. 5 is a flow diagram of a process for dynamically determining procurement user types in an illustrative embodiment. In step 500, data, from multiple data sources associated with multiple procurement users, pertaining to interactions between the multiple procurement users and one or more procurement destinations, are extracted. Such a step can be carried out, for example, by data analytics aggregator 130 in the FIG. 1 embodiment. The data pertaining to interactions between the multiple procurement users and one or more procurement destinations can include data pertaining to spending information associated with the multiple procurement users. Further, the data pertaining to interactions between the multiple procurement users and one or more procurement destinations can include data pertaining to one or more purposes of a visit to the one or more procurement destinations, data pertaining to at least one of one or more web site errors and bounce rate, and/or data pertaining to at least one of a web browser and an operating system of the multiple procurement users.

Further, the data pertaining to interactions between the multiple procurement users and one or more procurement destinations can include data pertaining to all procurements made by the multiple procurement users at the one or more procurement destinations, data pertaining to an amount of time spent by the multiple procurement users per visit to each of the one or more procurement destinations, and/or data pertaining to geographic data associated with the multiple procurement users. Additionally, the data pertaining to interactions between the multiple procurement users and one or more procurement destinations can include data pertaining to one or more average paths taken by the multiple procurement users to each of the one or more procurement destinations, data pertaining to identification of one or more sub-destinations visited by the multiple procurement users within the one or more procurement destinations, and/or data pertaining to identification of one or more actions taken by the multiple procurement users within the one or more procurement destinations.

In step 502, based on an application of one or more machine learning algorithms to the extracted data, one or more existing procurement user types are dynamically updated. Such a step can be carried out, for example, by procurement user type determination engine 132 in the FIG. 1 embodiment. Dynamically updating the one or more existing procurement user types can include automatically detecting, via the application of the one or more machine learning algorithms to the extracted data, when one or more procurement users change with respect to one or more trends. In step 504, based on the application of the one or more machine learning algorithms to the extracted data, one or more new procurement user types are dynamically created. Such a step can be carried out, for example, by procurement user type determination engine 132 in the FIG. 1 embodiment.

In step 506, via at least one user portal, the one or more updated procurement user types and the one or more new procurement user types are output. Such a step can be carried out, for example, by procurement user type representation generator 134 in the FIG. 1 embodiment. Outputting the one or more updated procurement user types and the one or more new procurement user types can include generating a sequence of output displays comprising (i) a menu display identifying all updated and created procurement user types, (ii) a procurement user type template display pertaining to a procurement user type selected from the menu display, and (iii) a procurement user type flow diagram pertaining to the procurement user type selected from the menu display.

The techniques depicted in FIG. 5 can additionally include enabling a user to modify, through the at least one user portal, at least one of the one or more updated procurement user types and the one or more new procurement user types by manual input of one or more items of qualitative information.

The particular processing operations and other system functionality described in conjunction with the flow diagram of FIG. 5 are therefore presented by way of illustrative example only, and should not be construed as limiting the scope of the disclosure in any way. Alternative embodiments can use other types of processing operations involving cloud infrastructure representation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to carry out the techniques of one or more embodiments of the invention detailed herein.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of dynamically determining procurement user types as disclosed herein can provide a number of significant advantages relative to conventional arrangements.

For example, some embodiments can advantageously enable users to see, in real-time, when new personas are introduced and/or how current personas and user behaviors evolve when a new product or feature has been introduced to a website or an IoT device. Also, one or more embodiments can enable users to analyze and learn from user actions and update a system, in real-time, when procurement users change behavior on a website or an IoT device.

Such arrangements overcome the difficulties that would otherwise be associated with conventional time-consuming and labor-intensive processes for building personas.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
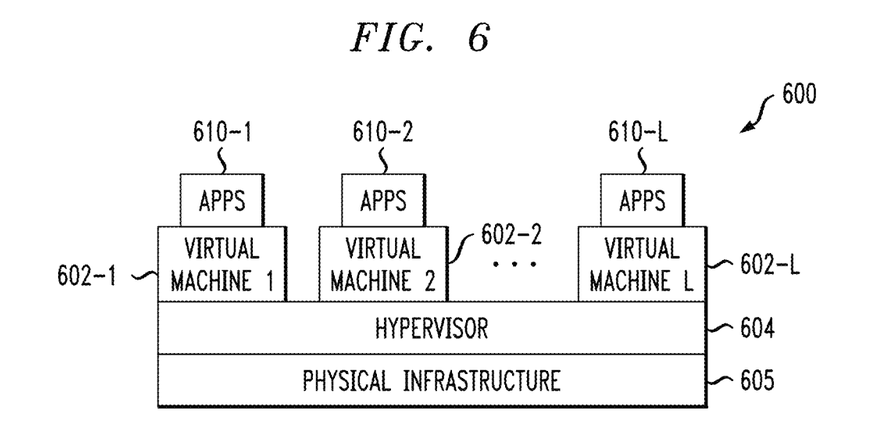
FIGS. 6 and 7 show examples of processing platforms that may be utilized to implement at least a portion of an information processing system in illustrative embodiments.
Figure 7:
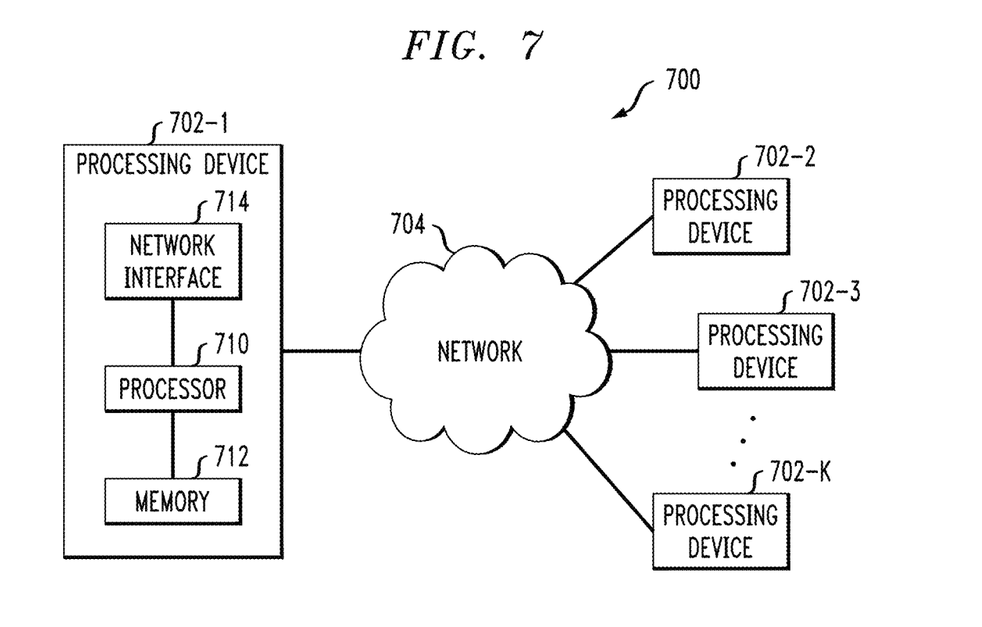

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises VMs 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide dynamic procurement user type determinations. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
   extracting data, from multiple data sources associated with multiple procurement users, pertaining to interactions between the multiple procurement users and one or more procurement destinations, wherein the data pertaining to interactions between the multiple procurement users and one or more procurement destinations comprise data pertaining to one or more website errors, data pertaining to bounce rate associated with the one or more procurement destinations, data pertaining to web browsers used by the multiple procurement users, and data pertaining to operating systems of the multiple procurement users;
   generating heat maps representing levels of interaction between at least a portion of the multiple procurement users and at least a portion of the one or more procurement destination;
   dynamically updating, based on an application of one or more machine learning-based association rule learning algorithms to the extracted data and at least a portion of the generated heat maps, one or more existing procurement user types by representing one or more effects of at least one new aspect of at least a portion of the one or more procurement destinations on behavior of the one or more existing procurement user types;
   dynamically creating, based on the application of the one or more machine learning-based association rule learning algorithms to the extracted data and at least a portion of the generated heat maps, one or more new procurement user types by representing one or more evolutions of procurement user behavior, distinct from behaviors exhibited by the one or more existing procurement user types, in response to an introduction of at least one new aspect to at least a portion of the one or more procurement destinations;
   outputting, via at least one user portal, information pertaining to the one or more updated procurement user types and the one or more new procurement user types;
   performing at least one automated action based at least in part on the information pertaining to the one or more updated procurement user types and the one or more new procurement user types; and
   automatically training at least a portion of the one or more machine learning-based association rule learning algorithms based at least in part on feedback comprising the information pertaining to the one or more updated procurement user types and the one or more new procurement user types;
   wherein the method is performed by at least one processing device comprising a processor coupled to a memory.

2. The computer-implemented method of claim 1, further comprising:
   enabling a user to modify, through the at least one user portal, at least one of the one or more updated procurement user types and the one or more new procurement user types by manual input of one or more items of qualitative information.

3. The computer-implemented method of claim 1, wherein the data pertaining to interactions between the multiple procurement users and one or more procurement destinations comprise data pertaining to spending information associated with the multiple procurement users.

4. The computer-implemented method of claim 1, wherein the data pertaining to interactions between the multiple procurement users and one or more procurement destinations comprise data pertaining to one or more purposes of a visit to the one or more procurement destinations.

5. The computer-implemented method of claim 1, wherein the data pertaining to interactions between the multiple procurement users and one or more procurement destinations comprise data pertaining to all procurements made by the multiple procurement users at the one or more procurement destinations.

6. The computer-implemented method of claim 1, wherein the data pertaining to interactions between the multiple procurement users and one or more procurement destinations comprise data pertaining to an amount of time spent by the multiple procurement users per visit to each of the one or more procurement destinations.

7. The computer-implemented method of claim 1, wherein the data pertaining to interactions between the multiple procurement users and one or more procurement destinations comprise data pertaining to geographic data associated with the multiple procurement users.

8. The computer-implemented method of claim 1, wherein the data pertaining to interactions between the multiple procurement users and one or more procurement destinations comprise data pertaining to one or more average paths taken by the multiple procurement users to each of the one or more procurement destinations.

9. The computer-implemented method of claim 1, wherein the data pertaining to interactions between the multiple procurement users and one or more procurement destinations comprise data pertaining to identification of one or more sub-destinations visited by the multiple procurement users within the one or more procurement destinations.

10. The computer-implemented method of claim 1, wherein the data pertaining to interactions between the multiple procurement users and one or more procurement destinations comprise data pertaining to identification of one or more actions taken by the multiple procurement users within the one or more procurement destinations.

11. The computer-implemented method of claim 1, wherein dynamically updating the one or more existing procurement user types comprises automatically detecting, via the application of the one or more machine learning-based association rule learning algorithms to the extracted data, when one or more procurement users change with respect to one or more trends.

12. The computer-implemented method of claim 1, wherein outputting the one or more updated procurement user types and the one or more new procurement user types further comprises generating a sequence of output displays comprising (i) a menu display identifying all updated and created procurement user types, (ii) a procurement user type template display pertaining to a procurement user type selected from the menu display, and (iii) a procurement user type flow diagram pertaining to the procurement user type selected from the menu display.

13. An apparatus comprising:
at least one processing device comprising a processor coupled to a memory;
said at least one processing device being configured:
to extract data, from multiple data sources associated with multiple procurement users, pertaining to interactions between the multiple procurement users and one or more procurement destinations, wherein the data pertaining to interactions between the multiple procurement users and one or more procurement destinations comprise data pertaining to one or more website errors, data pertaining to bounce rate associated with the one or more procurement destinations, data pertaining to web browsers used by the multiple procurement users, and data pertaining to operating systems of the multiple procurement users;
to generate heat maps representing levels of interaction between at least a portion of the multiple procurement users and at least a portion of the one or more procurement destination;
to dynamically update, based on an application of one or more machine learning-based association rule learning algorithms to the extracted data and at least a portion of the generated heat maps, one or more existing procurement user types by representing one or more effects of at least one new aspect of at least a portion of the one or more procurement destinations on behavior of the one or more existing procurement user types;
to dynamically create, based on the application of the one or more machine learning-based association rule learning algorithms to the extracted data and at least a portion of the generated heat maps, one or more new procurement user types by representing one or more evolutions of procurement user behavior, distinct from behaviors exhibited by the one or more existing procurement user types, in response to an introduction of at least one new aspect to at least a portion of the one or more procurement destinations;
to output, via at least one user portal, information pertaining to the one or more updated procurement user types and the one or more new procurement user types;
to perform at least one automated action based at least in part on the information pertaining to the one or more updated procurement user types and the one or more new procurement user types; and
to automatically train at least a portion of the one or more machine learning-based association rule learning algorithms based at least in part on feedback comprising the information pertaining to the one or more updated procurement user types and the one or more new procurement user types.

14. The apparatus of claim 13, wherein the at least one processing device is further configured:
to enable a user to modify, through the at least one user portal, at least one of the one or more updated procurement user types and the one or more new procurement user types by manual input of one or more items of qualitative information.

15. The apparatus of claim 13, wherein the data pertaining to interactions between the multiple procurement users and one or more procurement destinations comprise data pertaining to identification of one or more actions taken by the multiple procurement users within the one or more procurement destinations.

16. A non-transitory processor-readable storage medium having stored therein program code of one or more software programs, wherein the program code when executed by at least one processing device causes said at least one processing device:
to extract data, from multiple data sources associated with multiple procurement users, pertaining to interactions between the multiple procurement users and one or more procurement destinations, wherein the data pertaining to interactions between the multiple procurement users and one or more procurement destinations comprise data pertaining to one or more website errors, data pertaining to bounce rate associated with the one or more procurement destinations, data pertaining to web browsers used by the multiple procurement users, and data pertaining to operating systems of the multiple procurement users;

to generate heat maps representing levels of interaction between at least a portion of the multiple procurement users and at least a portion of the one or more procurement destination;

to dynamically update, based on an application of one or more machine learning-based association rule learning algorithms to the extracted data and at least a portion of the generated heat maps, one or more existing procurement user types by representing one or more effects of at least one new aspect of at least a portion of the one or more procurement destinations on behavior of the one or more existing procurement user types;

to dynamically create, based on the application of the one or more machine learning-based association rule learning algorithms to the extracted data and at least a portion of the generated heat maps, one or more new procurement user types by representing one or more evolutions of procurement user behavior, distinct from behaviors exhibited by the one or more existing procurement user types, in response to an introduction of at least one new aspect to at least a portion of the one or more procurement destinations;

to output, via at least one user portal, information pertaining to the one or more updated procurement user types and the one or more new procurement user types;

to perform at least one automated action based at least in part on the information pertaining to the one or more updated procurement user types and the one or more new procurement user types; and to automatically train at least a portion of the one or more machine learning-based association rule learning algorithms based at least in part on feedback comprising the information pertaining to the one or more updated procurement user types and the one or more new procurement user types.

17. The processor-readable storage medium of claim 16, wherein the program code further causes said at least one processing device:

to enable a user to modify, through the at least one user portal, at least one of the one or more updated procurement user types and the one or more new procurement user types by manual input of one or more items of qualitative information.

18. The processor-readable storage medium of claim 16, wherein the data pertaining to interactions between the multiple procurement users and one or more procurement destinations comprise data pertaining to identification of one or more actions taken by the multiple procurement users within the one or more procurement destinations.

19. The processor-readable storage medium of claim 16, wherein dynamically updating the one or more existing procurement user types comprises automatically detecting, via the application of the one or more machine learning-based association rule learning algorithms to the extracted data, when one or more procurement users change with respect to one or more trends.

20. The processor-readable storage medium of claim 16, wherein outputting the one or more updated procurement user types and the one or more new procurement user types further comprises generating a sequence of output displays comprising (i) a menu display identifying all updated and created procurement user types, (ii) a procurement user type template display pertaining to a procurement user type selected from the menu display, and (iii) a procurement user type flow diagram pertaining to the procurement user type selected from the menu display.

\* \* \* \* \*

UNITED STATES PATENT AND TRADEMARK OFFICE
CERTIFICATE OF CORRECTION

| | |
|---|---|
| PATENT NO. | : 11,157,923 B1 |
| APPLICATION NO. | : 15/883688 |
| DATED | : October 26, 2021 |
| INVENTOR(S) | : Paul Sturrs and Liam Donnelly |

It is certified that error appears in the above-identified patent and that said Letters Patent is hereby corrected as shown below:

In the Claims

In Claim 1, Column 12, Lines 10-13, replace:
"generating heat maps representing levels of interaction between at least a portion of the multiple procurement users and at least a portion of the one or more procurement destination;"
With:
-- generating heat maps representing levels of interaction between at least a portion of the multiple procurement users and at least a portion of the one or more procurement destinations; --

In Claim 13, Column 14, Lines 1-4, replace:
"to generate heat maps representing levels of interaction between at least a portion of the multiple procurement users and at least a portion of the one or more procurement destination;"
With:
-- to generate heat maps representing levels of interaction between at least a portion of the multiple procurement users and at least a portion of the one or more procurement destinations; --

In Claim 16, Column 15, Lines 1-4, replace:
"to generate heat maps representing levels of interaction between at least a portion of the multiple procurement users and at least a portion of the one or more procurement destination;"
With:
-- to generate heat maps representing levels of interaction between at least a portion of the multiple procurement users and at least a portion of the one or more procurement destinations; --

Signed and Sealed this
Twelfth Day of December, 2023

Katherine Kelly Vidal
*Director of the United States Patent and Trademark Office*